United States Patent [19]

Goobich et al.

[11] Patent Number: 5,064,482

[45] Date of Patent: Nov. 12, 1991

[54] NO-CLEAN SOLDER PASTE VEHICLE

[75] Inventors: Joel Goobich, Orange Village; Thomas Cronin, III, North Royalton, both of Ohio

[73] Assignee: SCM Metal Products, Inc., Cleveland, Ohio

[21] Appl. No.: 610,552

[22] Filed: Nov. 8, 1990

[51] Int. Cl.$^5$ .............................................. B23K 35/34
[52] U.S. Cl. .......................................... 148/24; 148/25
[58] Field of Search .................................... 148/24, 25

[56] References Cited

U.S. PATENT DOCUMENTS

| | | | |
|---|---|---|---|
| 3,162,551 | 12/1964 | Short | 148/24 |
| 3,171,734 | 3/1965 | Benson | 148/24 |
| 3,697,333 | 10/1972 | Hoefflern | 148/24 |
| 4,325,754 | 4/1982 | Mizuhara | 148/24 |
| 4,557,768 | 12/1985 | Barringer | 148/25 |
| 4,701,224 | 10/1987 | Zado | 148/25 |

Primary Examiner—Peter D. Rosenberg
Attorney, Agent, or Firm—Lieberman Rudolph & Nowak

[57] ABSTRACT

A paste vehicle for use in a metal bearing solder paste composition having a heat-polymerizable binder is provided. This vehicle can be non-aqueous, inorganic salt-free and dispersed in a non-aqueous, organic liquid, and may be incorporated with a flux into a solder paste composition capable of utilizing an average particle size finer than 100 mesh. This paste has excellent anti-slump properties, requires no cleanup to remove residual solder reflow, and permits smaller more controlled joints to be formed.

20 Claims, No Drawings

NO-CLEAN SOLDER PASTE VEHICLE

BACKGROUND OF THE INVENTION

The subject invention relates to solder pastes or creams and more particularly to the vehicles used therein.

Today's electronics industry requires the production of circuit boards that are more complex and more densely arranged then those used in the past. Accordingly, there is need for solder pastes and creams capable of producing smaller, more closely spaced solder joints. Currently, solder paste vehicle are limited in producing solder pastes capable of achieving ultra small joints with high density. This has retarded the growth of the electronics industry and has limited the development of new technologies.

Solder pastes and creams (hereinafter, "pastes") have been used for years in the microelectronic industry for forming strong mechanical joints and electrical connections between discrete electronic components and conductive pathways. These pastes, as with all solder materials, require a chemical flux to facilitate the soldering action. This flux is used to prepare the surface to be soldered and the solder metal, by removing the surface oxides present on both surfaces. This chemical cleansing action allows molten solder to form a metal-metal bond with the surface to be soldered, essential for good electrical and mechanical bonding.

Many types of fluxes have been used in soldering in general, and in solder pastes and creams in particular. The military specification QQS571 described many of the requirements that these materials should possess. In general there are four major categories of fluxes based on composition and fluxing strenght; R, RMA, RA and OA. The R, RA and RMA grades materials are based on using the chemical properties of wood rosin and chemically modified resins to provide the fluxing action. The R grade is the weakest of the three types, the RA the strongest. Differences in fluxing action are obtained by using rosin/resins with more acidic content and by incorporating other non-resin chemicals into the formulation. These chemicals can include various carboxylic acids, chlorinated hydrocarbons and amine activators. The OA grade does not use any rosin or resin, and is based on the use of organic acids, mostly carboxylic acids, to provide the fluxing action. In addition to the above-described chemically active constituents, fluxing formulations used in solder cream and paste manufacture include two other major classes of materials: binder and solvents.

Binders provide viscosity and other thixotropic properties to the vehicle. In addition to solid binder, solid or liquid surface active agents can be incorporated to impart proper wetting, flow and storage properties to the vehicle.

Solvents act primarily to dissolve fluxes, activators, binders and surface active agents. A solvent can be a single solvent or a mixture of different types of solvents. Solvent liquids are used for their dissolving ability and to impart certain theological (flow) properties to the paste.

Solder pastes or creams are made by creating an intimate mixture of solder powder and gel-like vehicles. The powders are finely divided mostly spherical, particles. They can have various chemical compositions depending on the makeup of the metal alloy. The size and shape of these powders play an important role in determining which vehicle system can and should be used to produce good mechanical solder joints. For many years, solder powders with a size distribution falling within the limits of a 200 and 325 standard ASTM sieve were considered adequate for most microelectronic soldering applications. Most fluxes, whether weakly activated R grade or highly activated RA grade, used these types of powders. With the increasing sophistication and component density requirements of printed circuit boards, the standard powders used in conjunction with existing vehicle technology were not able to produce solder with the necessary density.

There was and is a growing need for finer powders which yield smaller, more closely spaced solder joints. This creates a greater demand on the vehicle systems used in these solder pastes. As the solder powder decreases in size, for example, from 400 to even 500 mesh powders, the surface area of the powder increases. This in turn increases the amount of surface oxides. Standard R or RMA type vehicles may not be sufficiently activated to facilitate proper fluxing action. In addition, the use of these finer powders changes the thixotropic behavior of the materials. The shear thinning properties are similar but not necessarily the same as when coarser powders are used.

Many of the chemicals used in the above-described formulations are not fugitive in the temperature range that is used to melt (reflow) the solder powder component of the paste. Therefore, upon cooling to room temperature, there remains an organic residue surrounding the soldered joint, made from some of the chemicals used in the vehicle system. In general, the majority of solvents have evaporated leaving a residue that is typically viscous or hard.

The microelectronics industry has traditionally removed residues in a post soldering cleaning operation. The purpose is two-fold. First, the finished circuitry is aesthetically more acceptable, and second, once the residues are removed, there exists less propensity for the circuitry and solder joints to be adversely affected by degradation brought on by ionic contamination.

The residues have been traditionally removed by chlorinated solvents and alcohols. These solvents are able t dissolve the remaining organic residue and have a low boiling point and high vapor pressure to facilitate fast evaporation and efficient drying and removal of residual solvent. The main type of solvents use for this purpose are so-called CFC's, chloro-fluorohydrocarbons.

The environmental danger, e.g. to the ozone, caused by CFC solvents, together with legislation, has motivated the industry to experiment with laternative cleaning solvents and vehicles. There now exist organic acid vehicles which are water soluble and are cleanable with just water or water in conjunction with a siphoning agent (essentially, soap and water). In addition, solvents with less ozone depleting power have been developed to replace CFCs, e.g. tepene and HCFC solvents.

Because of the cosmetic and reliability concerns described above, residues must meet a number of stringent criteria. First, the vehicle residue should be below a certain ionic threshold value. Accordingly, the ionic activity of the flowing vehicle must be relatively low so that the ionic strenght of the residue is also low. On the other hand it is important to maintain the ability to produce dense fine space solder joints, i.e. by using finer solder powder.

The second important concern is reducing the flow of the residue away from the solder joint. This property is referred to as "hot-slump". After solder reflow, residue is typically left around the perimeter of the solder joint. It is important that the remaining residue be hard and not tacky to reduce the possibility of contamination by dust and dirt particles which may cause electric shorts or degradation of the solder joint or other board circuitry. Therefore, a major requirement for a no-clean vehicle systems is a hard residue with low flow properties at elevated temperatures.

Many different ingredients and mixtures have been suggested and used in an attempt to prevent "hot-slump". For example, prior art attempts have typically included the use of high viscosity compounds such as petroleums and gum thickeners. However, the pastes of the prior art were limited because they spread upon heating, were unformable into small dots, were unstable (i.e. prematurely coagulated), were too viscous to dispense, and left residue which required toxic chemicals to clean.

The subject invention fulfills a long flex need for a no-clean vehicle having excellent "hot-slump" properties and a capacity to permit the soldering of closely spaced joints.

SUMMARY OF THE INVENTION

The subject invention provides a paste vehicle for use in a metal bearing solder paste composition which comprises a heat-polymerizable binder.

The subject invention provides a solution to this long felt need by using thermoset and/or thermoplastic monomers or oligomers that polymerize in situ. Moreover, the subject vehicle requires no-clean up after soldering (melting). This provides the economic benefit of eliminating the normally required washing process and the environmental benefit of reducing the use of environmentally harmful solvents.

The subject invention differs from the prior art in a number of ways;
1. use of in situ polymerization of a polymer encapsulate;
2. use of thermoset polymers to improve "hot-slump" properties;
3. formation of hard, clear, restrictive residue of low ionic value; and
(4. use of a low activity fluxing formulation in conjunction with fine, high surface area solder powders.

DETAILED DESCRIPTION OF THE INVENTION

The subject invention concerns the manufacture of a vehicle system for use in a no-clean solder paste. The fluxing vehicle typically comprises resin based fluxes as well as fugitive acid and amine activators which evaporate at the temperatures required for solder reflow. The essence of the invention lies in the incorporation of a thermoset and/or thermoplastic polymer to impart better fracture toughness and lucidity (clearness) to the residual solder reflow. In addition, the subject invention provides a paste with very good "hot-slump" properties. Preferably, the only polymerization undergone by the paste in situ polymerization sccurring during the actual solder reflow process. Therefore, the solder paste made from this vehicle has an extended shelf life with a reduced propensity for premature polymerization.

The subject invention provides a preferably non-aqueous, preferably inorganic substantially salt-free paste vehicle for use in a metal bearing paste composition which comprises a heat-polymerizable binder dispersed in a preferably non-aqueous organic liquid. The heat-polymerizable binder typically comprises a polymer precursor. Typically, the polymer precursors represent up to about 40% by weight of the vehicle. Preferably, the polymer precursors are present from about 2% to about 15% by weight of the vehicle, and most preferably the polymer precursors represent about 5% by weight of the vehicle for dispensing applications and about 10% to about 15% by weight of the vehicle for printing applications. Polymer precursors are typically monomers or oligomers that can be assembled to form a polymer. Most preferably, these polymer precursors form a hard clean encapsulate network during solder reflow.

In a preferred embodiment, the polymer precursors are precursors of polyester, polyurethanes, epoxides, polyisocyanates or polyacrylate. Such precursors may be monomers or oligomers. When heated, these precursors join together to form the polymer.

When the monomer or ogliomer is a polyester precursor, the monomer or olgiomer is typically unsaturated. To speed the reaction, a catalyst may be added. Preferably, this catalyst is a peroxide catalyst. Another preferred embodiment is where the polyester is cross-linked by styrene.

When the polymer precursor is a polyurethane precursor, it typically comprises blocked isocyanate and saturated polyester monomers or logiomers. A catalyst may be added to speed up the reaction. A preferred catalyst is an organic metal catalyst and is most preferably dibutyl tin dilaurate.

The essence of the subject of invention is the use of thermoset and/or thermoplastic polymer precursors in a conventional paste vehicle system.

Binders based on polyolefinic polymers, waves, cellulose derivative materials, natural gums, hydrogenated castor oils and linear thermoplastic polyacrylic polymers among others may also be incorporated into the vehicle.

A single solvent or mixture of different types of solvents may also be incorporated into the subject vehicle. Typically, the solvents represent from about 10% to about 50% by weight of the vehicle. Typical solvents usable in the subject vehicle preparations include glycol ethers, alcohols and terpene based chemicals.

To provide maximum anti-hot-slump properties, it is preferably that a component, e.g. the organic material in the vehicle has a surface tension of 43 dynes/cm or greatest 20° C. The advantage of such high viscosity organic components as well as basic vehicle technology are described in U.S. Pat. Nos. 4,541,876, Re. 32,309 and 4,619,715, issued to Jenne S. Hwang, and herein incorporated by reference.

Solder pastes or creams maybe made by intimately mixing the subject vehicle, with a solder powder.

The subject invention preferably provides a powdered metal soft solder paste composition containing from 75%-95% by weight of a powdered soft solder metal or powdered soft solder metal allow having an average particle size finer than 100 mesh, a flux, and from 5-15% by weight of a vehicle described above. Preferably, the soft solder metal powder composition has a particle size of −200 to +500 mesh (US Standard Screen Size). Most preferably, the paste composition is non-aqueous and inorganic salt-free.

The following examples are set forth to illustrate the subject invention, but are not to be construed as limiting its scope.

EXAMPLE 1

Solution A
1. 22.5 grams of a glycol ether solvent such as Dowanol DPnB (Dow Chemicals)
2. 5.5 grams of a glycol ether solvent such as triglyme (Grant Chemicals)
3. 5.5 grams of primary, secondary and/or tertiary amine such as mixed Isopropanol Amine Mixture (Dow Chemicals)
4. 6.0 grams of a hydrogenated castor oil such as Thixatrol ST (NL Industries)
5. 5.5 grams of a polyhyroxylated solvent such as glycerol
6. 22.0 grams of a thermoplastic, acidic chemically modified hydrogenated wood rosin such as Foral AX (Hercules)
7. 17.5 grams of a partial ester of a dibasic acid modified tall oil rosin such as Sylvatac 203 (Arizona Chemicals)
8. 3.0 grams of a carboxylic acid such as piccolinic acid
9. 12.0 grams of an unsaturated polyester monomer such as Roskydal 850 (Mobay Chemicals)
10. 0.5 grams of an amine such as benzotriazole amine (BTA)

Solution B
1. A perozide catalyst such as Lupersol 130 (Penwalt)

A final mixture is made up as follows:
1. 98 grams of solution A
2. 2 grams of solution B

EXAMPLE 2

Solution A
1. 11 grams of a glycol ether solvent such as Dowanol DPnB (Dow Chemical)
2. 10.5 grams of a glycol ether solvent such as Dowanol DPM (Dow Chemical)
3. 12 grams of a glycol ether solvent such as Triglyme (Grant Chemical)
4. 5.5 grams of primary, secondary and/or tertiary amine such as Mixed Isopropanol Amine Mixture (Dow Chemical)
5. 6 grams of a hydrogenated castor oil such as Thixatrol ST (NL Industries)
6. 11 grams of polyhyroxylated solvent such as glycerl
7. 22 grams of a thermoplastic, acidic chemically modified hydrogenated wood rosin such as Foral AX (hercules)
8. 18 grams of a partial ester of a dibasic acid modified tall oil rosin such as Sylvatac 203 (Arizona Chemicals)
9. 1 gram of a carboxylic acid such as piccolinic acid
10. 3 grams of a thermoplastic acidic partially hydrogenated rosin such as Staybelite Ester 3 (Hercules)

Solution B
1. 41.67 grams of a polyester monomer such as Desmophen 670A (Mobay Chemicals)
2. 57.29 grams of a blocked isocyanate monomer such as Desmodur 7012 (Mobay Chemicals) p1 3. 1.04 grams of a dibutyl tin dilaurate catalyst such as Metacure T-12 (Mooney Chemicals)

A final mixture is made up as follows:
1. 95 grams of solution A
2. 5 grams of solution B

EXAMPLE 3

The following material are heated in a glass beaker and mixed using a magnetic stirring bar to make Solution A.

Solution A
1. 25 grams of glycol ether solvent such as Butyl Carbitol (Dow Chemicals - Dowanol DG)
2. 15 grams of terpeniol solvent such as Terpineol 318 (SCM Chemicals)
3. 3 grams of tertiary amine such as triethanolamine 4.
5. 6 grams of poly hydroxylated solvent such as glycerol
6. 45 grams of chemically modified resin such as Foral AX (Hercules)
7. 2 grams of carboxylic acid such as piccolinic acid The solution was allowed to cool. The following solution (B) is then made.
1. 98 grams of unsaturated polyester (monomer)
2. 2 grams of peroxide initiator A final mixture is now made as follows:
1. 85 grams of solution A
2. 15 grams of solution B To this mixture are added 900 grams of finely divided solder powder with a nominal particle size distribution of 25-45 microns. The solder alloy is comprised of 62% tin, 36% lead and 2% sliver.

The above examples and description of the subject invention are not intended to be limiting. Upon reading the specification, certain alternative embodiments will become obvious to those skilled in the field. These embodiments are to be considered within the scope and spirit of the subject invention. Accordingly, the subject invention is only to be limited by its claims and their equivalents.

What is claimed is:

1. A paste vehicle for use in a metal bearing solder paste composition which comprises a heat-polymerizable binder.

2. A vehicle of claim 1, wherein the heat-polymerizable binder comprises a polymer precursor.

3. A vehicle of claim 2, wherein the polymer precursor is a monomer or an oligomer.

4. A vehicle of claim 2, wherein the polymer precursor forms a clear encapsulate network during solder reflow.

5. A vehicle of claim 2, wherein the polymer precursor is a precursor of a polymer selected from the group consisting of polyesters, polyurethanes, epoxides, polyisocyanates, and polyacrylate.

6. A vehicle of claim 5, wherein the polymer precursor is a polyester precursor composed of polyester monomers or oligomers.

7. A vehicle of claim 6, wherein the polyester, monomer or oligomer is unsaturated.

8. A vehicle of claim 7 further comprising a catalyst.

9. A vehicle of claim 8, wherein the catalyst is an peroxide catalyst.

10. A vehicle of claim 8, wherein the polyester is cross-linked by styrene.

11. A vehicle claim 5, wherein the polymer precursor is a polyurethane precursor comprising blocked isocyanate and saturated polyester monomers or oligomers.

12. A vehicle of claim 11 further comprising a catalyst.

13. A vehicle of claim 12, wherein the catalyst is an organometallic catalyst.

14. A vehicle of claim 13, wherein the organometallic catalyst is dibutyl tim dilaurate.

15. A vehicle of claim 1 further comprising a flux.

16. A vehicle of claim 1 further comprising a substantially non-aqueous organic liquid.

17. A vehicle of claim 16, wherein the substantially non-aqueous organic liquid has a surface tension of about 43 dynes/cm or greater at 20° C.

18. A vehicle of claim 1 that is substantially non-aqueous and substantially free of inorganic salts.

19. A powdered metal soft solder paste composition containing from 75%-95% by weight of a powdered soft solder metal or powdered soft solder metal alloy having an average particle size finer than 100 mesh, a flux, and from about 5 to about 15% by weight of the vehicle of claim 1.

20. A paste of claim 19, wherein the soft solder metal powder composition has a particle size of −200 to +500 mesh (US Standard Screen Size).

* * * * *